US008327316B2

(12) United States Patent
Chouinard et al.

(10) Patent No.: US 8,327,316 B2
(45) Date of Patent: Dec. 4, 2012

(54) COMPILATION MODEL

(75) Inventors: Julien Chouinard, Magog (CA); Gilles Brunet, St-Hubert (CA); Denis Lavallee, St-Constant (CA); Chan-Dara Trang, Brossard (CA); Jean-Francois Laliberte, Boucherville (CA); Frédéric Darveau, St-Hubert (CA); Olivier Larouche, Boucherville (CA)

(73) Assignee: ICS Triplex Isagraf Inc., Brossard, Quebec (CA)

( * ) Notice: Subject to any disclaimer, the term of this patent is extended or adjusted under 35 U.S.C. 154(b) by 1071 days.

(21) Appl. No.: 12/242,662

(22) Filed: Sep. 30, 2008

(65) Prior Publication Data

US 2010/0083223 A1   Apr. 1, 2010

(51) Int. Cl.
*G06F 9/44* (2006.01)
*G06F 9/45* (2006.01)

(52) U.S. Cl. .................. 717/100; 717/140; 717/146

(58) Field of Classification Search .............. None
See application file for complete search history.

(56) References Cited

U.S. PATENT DOCUMENTS

| 6,076,020 | A  | * | 6/2000  | Schwenke et al. | 700/18  |
|-----------|----|---|---------|-----------------|---------|
| 7,107,586 | B2 | * | 9/2006  | Ishiwata        | 717/162 |
| 7,533,376 | B2 | * | 5/2009  | Anwar et al.    | 717/146 |
| 2003/0236577 | A1 | * | 12/2003 | Clinton      | 700/10  |
| 2004/0267515 | A1 | * | 12/2004 | McDaniel et al. | 703/22 |
| 2006/0080635 | A1 | * | 4/2006  | Anwar et al.    | 717/100 |
| 2006/0080682 | A1 | * | 4/2006  | Anwar et al.    | 719/331 |
| 2010/0083213 | A1 | * | 4/2010  | Chouinard et al. | 717/100 |
| 2010/0083223 | A1 | * | 4/2010  | Chouinard et al. | 717/146 |
| 2010/0083229 | A1 | * | 4/2010  | Chouinard et al. | 717/100 |
| 2010/0083232 | A1 | * | 4/2010  | Chouinard et al. | 717/124 |
| 2010/0083239 | A1 | * | 4/2010  | Chouinard et al. | 717/137 |
| 2010/0180267 | A1 | * | 7/2010  | Huang et al.    | 717/140 |
| 2010/0268358 | A1 | * | 10/2010 | Cantarelli et al. | 717/140 |

FOREIGN PATENT DOCUMENTS

WO  0038040 A  6/2000

(Continued)

OTHER PUBLICATIONS

Rzońca et al., "Prototype environment for controller programming in the IEC 61131-3 ST language", ComSIS vol. 4, No. 2, Dec. 2007; <http://www.doiserbia.nb.rs/img/doi/1820-0214/2007/1820-02140702131R.pdf>.*

(Continued)

*Primary Examiner* — Thuy Dao
*Assistant Examiner* — Ben C Wang
(74) *Attorney, Agent, or Firm* — Turocy & Watson, LLP; Alexander R. Kuszewski; John M. Miller

(57) ABSTRACT

The claimed subject matter provides a system and/or method that facilitates creating executable code for an industrial environment. A language editor can enable a programming of a portion of data within a programming language. A compiler can compile the portion of data within the programming language. An assembler component can utilize an intermediate language to convert the portion of data into a portion of assembly object code, wherein the assembly object code is target independent. A linker can create a binary file from the portion of assembly object code, wherein the binary file is target independent. A loader can specifically tailor the binary file to a target resource by leveraging at least one PLC definition, wherein the loader creates a target executable code (TEC) program at runtime or at development time.

16 Claims, 10 Drawing Sheets

FOREIGN PATENT DOCUMENTS

WO  2004021175 A2  3/2004

OTHER PUBLICATIONS

Johnston et al., "Advances in Dataflow Programming Languages", ACM Computing Surveys, vol. 36, No. 1, Mar. 2004, pp. 1-34; <http://dl.acm.org/citation.cfm?id=1013208.1013209&coll=DL&dl=GUIDE&CFID=97844629&CFTOKEN=24095281>.*

Taruishi et al., "Development of Industrial Control Programming Environment Enhanced by Extensible Graphic Symbols", SICE-ICASE International Joint Conference 2006, Oct. 18, 2006 Bexco, Busan, Korea; <http://ieeexplore.ieee.org/stamp/stamp.jsp?tp=&arnumber=4108699>.*

European Search Report dated Nov. 6, 2009 for European Patent Application Serial No. EP09171780.1, 8 pages.

Rob Van De Weg R et al. An Environment for Object-Oriented Real-Time Systems Design. Software Engineering Environments, Eighth Conference on Cottbus, Germany Apr. 8-9, 1997, Los Alamitos, CA, USA, IEEE Comput. Soc, US, Apr. 8, 1997; 12 pages.

* cited by examiner

COMPILATION MODEL

TECHNICAL FIELD

The subject invention relates to industrial control systems and, more particularly, to universally programming a resource associated with an industrial environment.

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases that are accessible by system/process/project managers on a factory floor. For instance, sensors and associated software can detect a number of instances that a particular machine has completed an operation given a defined amount of time. Further, data from sensors can be delivered to a processing unit relating to system alarms. Thus, a factory automation system can review collected data and automatically and/or semi-automatically schedule maintenance of a device, replacement of a device, and other various procedures that relate to automating a process.

While various advancements have been made with respect to automating an industrial process, utilization and design of controllers have been largely unchanged. In more detail, industrial controllers have been designed to efficiently undertake real-time control. For instance, conventional industrial controllers receive data from sensors and, based upon the received data, control an actuator, drive, or the like. These controllers recognize a source and/or destination of the data by way of a symbol and/or address associated with source and/or destination. More particularly, industrial controllers include communications ports and/or adaptors, and sensors, actuators, drives, and the like are communicatively coupled to such ports/adaptors. Thus, a controller can recognize device identity when data is received and further deliver control data to an appropriate device.

Unfortunately, traditional controllers and devices employed within automation industrial environments have fallen behind recent technological advances to which the automation industry has maintained stride for stride. Conventional controllers and devices are rigid and inflexible such that software associated therewith must be specifically tailored and/or programmed. In other words, each controller and/or device typically requires specific code or software in order to be utilized within an industrial process. Moreover, within the industrial automation industry, various programming languages exits and can be implemented to create and employ such processes. Adding to the complexity of programming controllers and devices is the inherent benefits and detriments of each programming language, wherein developers must choose among programming languages in order to create processes.

Some software development programs compile high-level control languages such as Ladder or SFC down to target system operating instructions. Often, the compilation is a compilation of higher level source code that has been translated to Programmable Logic Controller (PLC) target code such as C+ source code that is compiled to C+ executable format. One problem is these systems are often inflexible in that they only support one type of high-level language compilation. An even bigger problem is execution performance. The compilation at the target level is often inefficient and far removed from the actual target hardware language which is the form of the highest possible execution format.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The subject innovation relates to systems and/or methods that facilitate generating an intermediate language from a plurality of language specific compilers for universal programming of a resource. Generally, the subject innovation can be compilation model that can reduce the amount of code required to implement a higher-level control solution and in-turn increases code execution performance. A plurality of editors supporting various languages can be employed. The output from the editors can be compiled by an assembler component to an intermediate language such as instruction list. The IL language can be linked to a binary format of high-performance instructions that are supported by target microprocessors and/or resources. A PLC definition is provided that defines the end user hardware environment in which a loader can provide a target executable code (TEC) program that is the binary source that has been adapted in view of the actual PLC hardware constraint described in the PLC definition.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION

Figure 1:
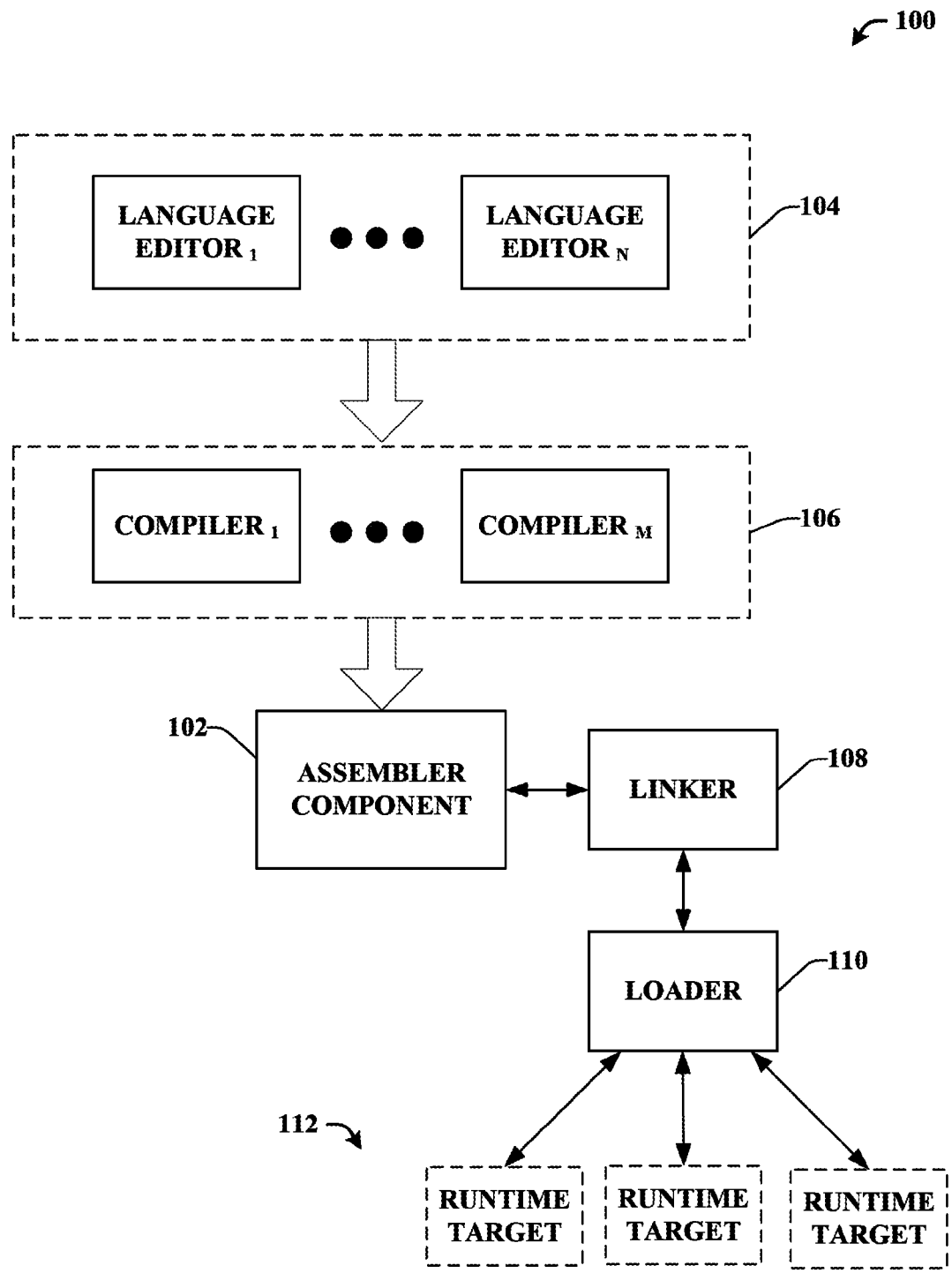
FIG. 1 illustrates a block diagram of an exemplary system that facilitates generating an intermediate language from a plurality of language specific compilers for universal programming of a resource.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component," "system," "assembler," "linker," "loader," "compiler," "editor," "device," and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Turning now to the drawings, FIG. 1 illustrates a system 100 that facilitates generating an intermediate language from a plurality of language specific compilers for universal programming of a resource. The system 100 can include an assembler component 102 that can generate an intermediate language for language specific compiled code, wherein the intermediate language can be hardware and/or processor independent as well as be adapted to specific resources, targets, processors, hardware, and the like. In other words, the assembler component 102 can receive language-specific code or applications and create a portion of data (e.g., intermediate language, etc.) that can be universally adapted to any suitable target (e.g., processor, hardware, device, platform, etc.) regardless of type, make, model, brand, and the like. Moreover, by employing such intermediate language, the system 100 can increase execution speed as well as maintain the ability to implement target independent code.

Specifically, at least one language editor 104 can enable the creation of a portion of code or application. It is to be appreciated that there can be any suitable number of language editors 104 such as language editor$_1$ to language editor$_N$, where N is a positive integer. Moreover, the language editors 104 can be associated with any suitable programming language such as, but not limited to, a ladder diagram (LD), a function block diagram (FBD), a structured text (ST), an instruction list (IL), a sequential function chart (SFC), 61499, any suitable programming language associated with a standard, any suitable programming language associated with an industrial process, etc. The at least one language editor 104 can include a respective and language specific compiler such as at least one compiler 106. It is to be appreciated that there can be any suitable number of compilers 106 such as compiler$_1$ to compiler$_M$, where M is a positive integer.

The assembler component 102 can receive the portion of compiled code or application in a specific language (e.g., a portion of data created in a specific language from at least one language editor 104) from at least one language specific compiler 106. The assembler component 102 can provide an intermediate language for the compiled code or application, wherein the intermediate language can be, for instance, instruction list (IL). The IL generated can be generic and universally created which, in turn, allows the intermediate language to be target (e.g., processor, hardware, etc.) independent. A linker 108 can provide any suitable linkage or associations for the intermediate language (e.g., the instruction list, etc.). The assemble component 102 and/or the linker 108 can assemble the intermediate language (here the instruction list) into a binary instruction list (IL). This target independent binary IL can be linked with any suitable data and/or hardware by the linker 108. The system 100 can further include the loader 110 that can employ the binary IL to at least one specific runtime target 112.

In general, the system 100 allows the generation of languages and compiling the languages to an intermediate language (e.g., instruction list), in which such instruction list can be associated to assembly code. The association to assembly code can be done with just in time (JIT) compiling. Thus, language specific code can be compiled to IL, the IL can be assembled to binary IL, and links can be provided with a binary file that is target independent. For example, the binary file can be a full application for an IL virtual processor. The just in time converter or compiler can convert the binary file or program to the specific target processor to which the code is to run (e.g., runtime targets 112). The system 100 allows the matching of just in time assembly code with an intermediate code, which can increase the execution speed while maintaining the ability to have target independent code.

Furthermore, a library (not shown) can be utilized, wherein the library can be on the IL side. The library can be generic rather than being specific to a particular processor. Thus, the library can be hardware independent rather than having data specific to a particular platform or processor (e.g., hardware specific data, etc.).

Moreover, the system 100 can include any suitable and/or necessary interface component (not shown), which provides various adapters, connectors, channels, communication paths, etc. to integrate the assembler component 102 into virtually any operating and/or database system(s). In addition, the interface component can provide various adapters, connectors, channels, communication paths, etc., that provide for interaction with the assembler component 102.

Figure 2:
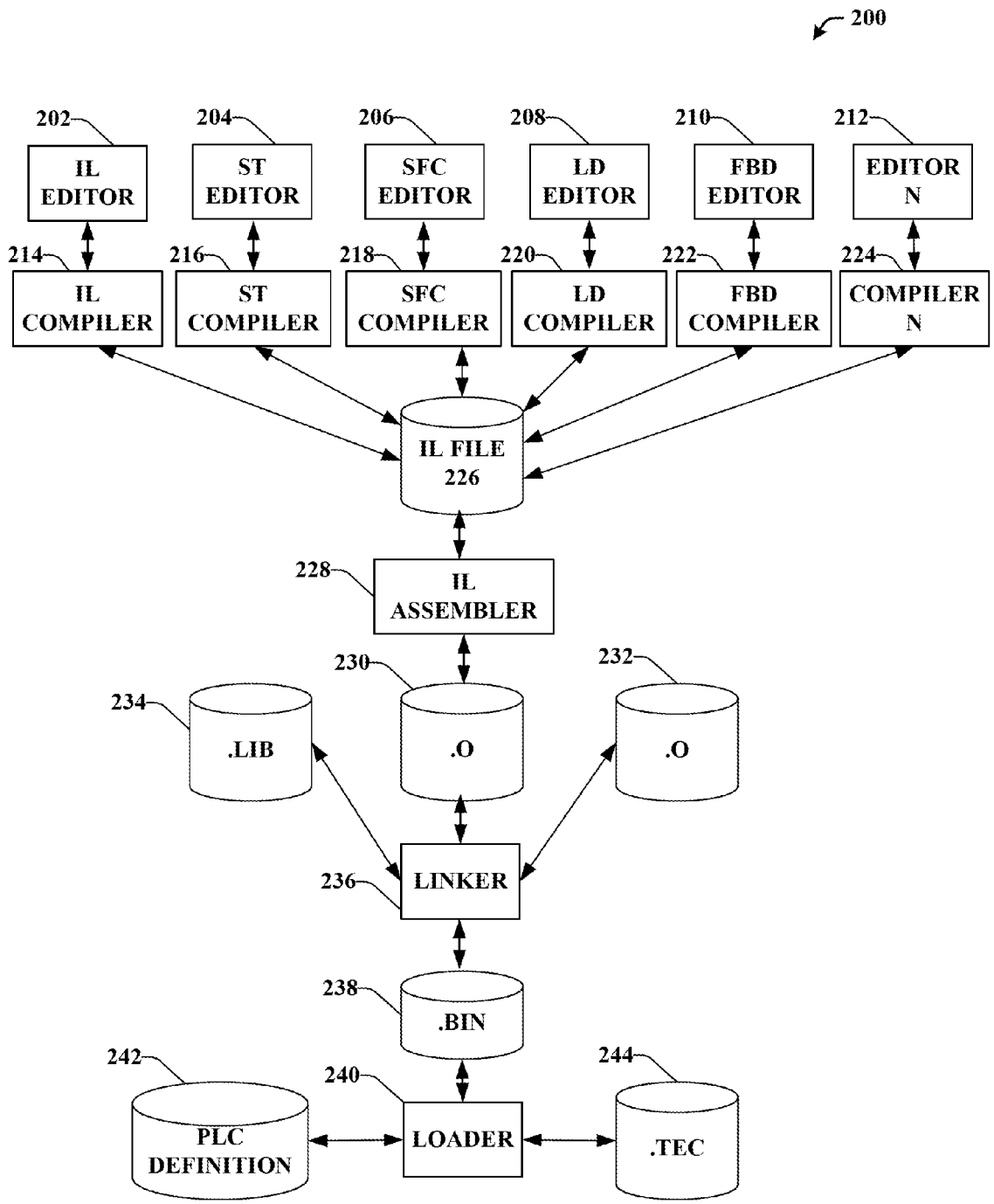
FIG. 2 illustrates a block diagram of an exemplary system that facilitates employing an intermediate language from various compilers to create a TEC code format control application.

FIG. 2 illustrates a system 200 that facilitates employing an intermediate language from various compilers to create a TEC code format control application. The system 200 can create an intermediate portion of data from a portion of compiled language specific code in order to enable universally adaptable code for any suitable processor and/or hardware. The system 200 can utilize a compilation model in which language specific code that has been compiled can be generated into an intermediate language (e.g., instruction list) that is target independent.

In general, the subject innovation can utilize configurations, resources, languages, and real-time operating systems. For example, a configuration can be a hardware platform for the resources, nodes, targets, or a device in IEC61499. The resource can be an independent, self contained control subsystem of the project. The resource can execute control application in TEC code format. Upon execution, the resource can be called a virtual machine (VM) and can be substantially similar to a PLC cycle. The resources can be programmed with a programming language, wherein the programming language can be related to the IEC61131-3 Standard including flow chart (FC) language. Additionally, a virtual machine can run over a real-time operating system. The resource can include functions, programs, function blocks, parameters, trends, alarms, variables, inputs, outputs, etc. Moreover, the functions can be multiple in and one out (e.g., non-retentive). The programs can be IEC61131-3 and flow chart programs. The function blocks can include multiple in and multiple out (e.g., retentive). The variables can include function and function block variables.

The system 200 can include various language editors specific to various programming languages. It is to be appreciated that the programming languages depicted are solely for illustrative purposes and the subject innovation is not to be limited to such programming languages listed or discussed herein. The following language editors can provide the creation of language specific code or applications: an instruction list (IL) editor 202; a structured text (ST) editor 204; a sequential function chart (SFC) editor 206; a ladder diagram (LD) editor 208; a function block diagram (FBD) editor 210; and any suitable editor$_N$ 212, where N is a positive integer. The specific language editors can include a corresponding compiler such as an IL compiler 214, an ST compiler 216, an SFC compiler 218, an LD compiler 220, an FBD compiler, and any suitable compiler$_M$ 222, where M is a positive integer.

The compiled code or application can be stored in a data store 226 (IL file 226), wherein the compiled code or application can be generated into an intermediate language such as instruction list. An IL assembler 228 (e.g., which can be substantially similar to the assembler component 102) can generate the IL file and/or associate the intermediate language into assembly code (also referred to as object code). The object code can be stored on a data store 230 (e.g., .O 230). A linker 236 can receive data from the data store 230 (.O 230) such as the assembly code created from the instruction list data. Moreover, the linker can receive or access data from a data store 234 (.LIB 234, a library of code or data related to the intermediate language) or a data store 232 (.O 232, a data store of object data related to the intermediate language). The linker 236 can create a binary instruction list file from the intermediate language (e.g., instruction list). The binary instruction list file can be stored in a data store 238 (.BIN 238), wherein a loader 240 can utilize such binary instruction list file, and/or a PLC definition (e.g., via a data store 242 storing the PLC definition) in order to create a target executable code (TEC) application or program stored on a data store 244 (.TEC 244).

The file format can include the following details. One compiler can be associated with a language type. An IL program format can be based on IEC61131 standard. An IL object can be the output of the assembler and can be relocated. An IL binary can be the linker output and can be target independent. The IL TEC can be the target executable code and can be target dependent. The TEC can be assembler native code. The TEC can be executable by the processor directly and can be extremely efficient and fast in terms of processing speed. The PLC and Programmable Automation Controller (PAC) definition contents can include the IL transformation code (e.g., cross assembler). Moreover, there can be one PLC definition file per processor type.

The object file can include the following details. An application bin can include user-specific applications which can include any user application objects and IL objects. The IL objects can include, but not limited to including, IEC61131_FNCT.o, IEC61131_FB.o, IEC61499_FB.o, AdvancedControl_FB.o, Math.o, Modbus.o, CIP.o, System.o, and/or Third_party.o.

The object and/or binary file format can include the following details: a name (e.g., 33 byte, null terminated name of the file), date (e.g., 12 byte AAMMJJHHMMSS), version (e.g., 4 byte, version number), identification (e.g., file identification), configuration size (e.g., 4 byte, configuration section size), Program Organization Unit (POU) size (e.g., 4 byte, program organization unit section size), data size (e.g., 4 byte, data section size), init size (e.g., 4 byte, data initialization section size), code size (e.g., 4 byte, code section size), configuration section (e.g., S byte size, configuration section, definition of parameters, S is a positive integer), POU section (e.g., T byte, POU section, function, function block, program list, T is a positive integer), data section (e.g., U byte, data section, variable declaration, U is a positive integer), init section (e.g., V byte, initialization section, variable init value, V is a positive integer), code section (e.g., Q byte, code section, binary logic, Q is a positive integer), and CRC (e.g., 4 byte, CRC 32 for the file).

Moreover, the system 200 can include data stores (e.g., data store 226, data store 230, data store 232, data store 234, data store 238, data store 242, and data store 244) that can store portions of data, code, applications, portions of software, intermediate language data, instruction list, assembly code, binary files, binary instruction list, processor data, target specific data, PLC definitions, object data, library data, object data, binary data, TEC application, etc. The data stores can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data stores of the subject systems and methods is intended to comprise, without being limited to, these and any other suitable types of memory. In addition, it is to be appreciated that the data stores can be a server, a database, a hard drive, and the like.

Figure 3:
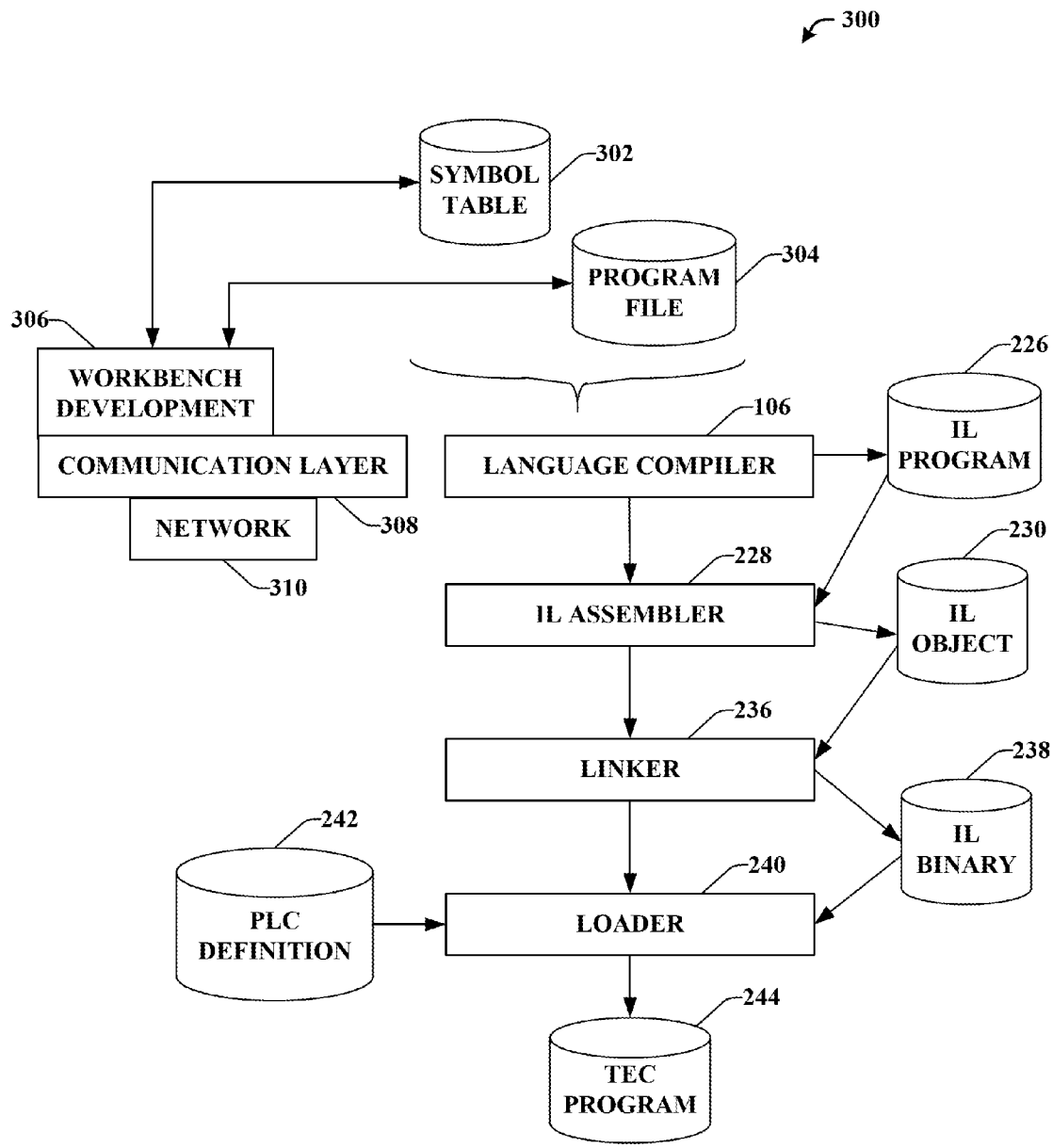
FIG. 3 illustrates a block diagram of an exemplary system that facilitates compiling a process in accordance with the subject innovation.

FIG. 3 illustrates a system 300 that facilitates compiling a process in accordance with the subject innovation. The system 300 can enable the creation of a target independent process while increasing the execution speed of a processor. In general, the system 300 can allow a portion of data from any suitable programming language to be generated into an intermediate language (e.g., instruction list), and such intermediate language can be assembled, linked, and/or loaded for a specific resource.

A workbench development platform 306 can be utilized to receive at least one of a symbol table 302 or a program file 304 from at least one data store. The workbench development 306 can communicate with a communication layer 308 over a network 310 in order to interact with a language compiler 106. The language compiler 106 can create an instruction list program within the data store 226. The IL assembler 228 can create an instruction list object within the data store 230. The linker 236 can create an instruction list binary within the data store 238. The loader 240 can leverage at least one PLC definition from the data store 242 in order to create a TEC program for a resource, device, target, etc. within the data store 244.

It is to be appreciated that the system 300 can provide the compilation of a process for any suitable target platform. For example, the platform can be, but is not limited to being, uCOS, RTX, Linux, QNX, a window based operating system, and/or any other suitable real-time operating system. The target can include at least one of the following characteristics: fast executed TEC code; small foot print for embedded system (e.g., 8 bit, 16 bit, 32 bit, or 64 bit CPU); highly portable code (e.g., virtual machine (VM)); modular and scalable; PLC loop or cycle on event; multiple resources per configuration; distributed architecture; full online change; C code; custom C function and function block add in; system hardware abstraction layer (e.g., message queue, semaphore, memory, timer, socket, etc.); word alignment compatible; input/output driver; communication driver; double redundancy; and/or Endian compatible.

The subject innovation can provide a runtime architecture as described above in terms of a just in time compilation of loading instruction list binary to a TEC program for a resource. The runtime architecture can include a single resource, and/or multiple resources. The runtime architecture can further be utilized in a distributed environment (e.g., configuration 1, configuration 2 to configuration X, where X is a positive integer).

The subject innovation can further employ a resource manager model. The resource manager model can be employed in which the following can be included: a task application programmable interface (API); a command manager; a task loader; a variable manager; a task scheduler; a timer manager; an interrupt manager; a memory manager; and a hardware abstraction layer. The subject innovation can further include at least one of a program model, an input/output driver model, or a communication driver model. The task can include at least one of a TEC program, an input/output, a comm., Math.tec, fnct.tec, fb.tec, System.tec, a task core, custom C function, custom function block, resource manager API, or a hardware abstraction layer.

Figure 4:
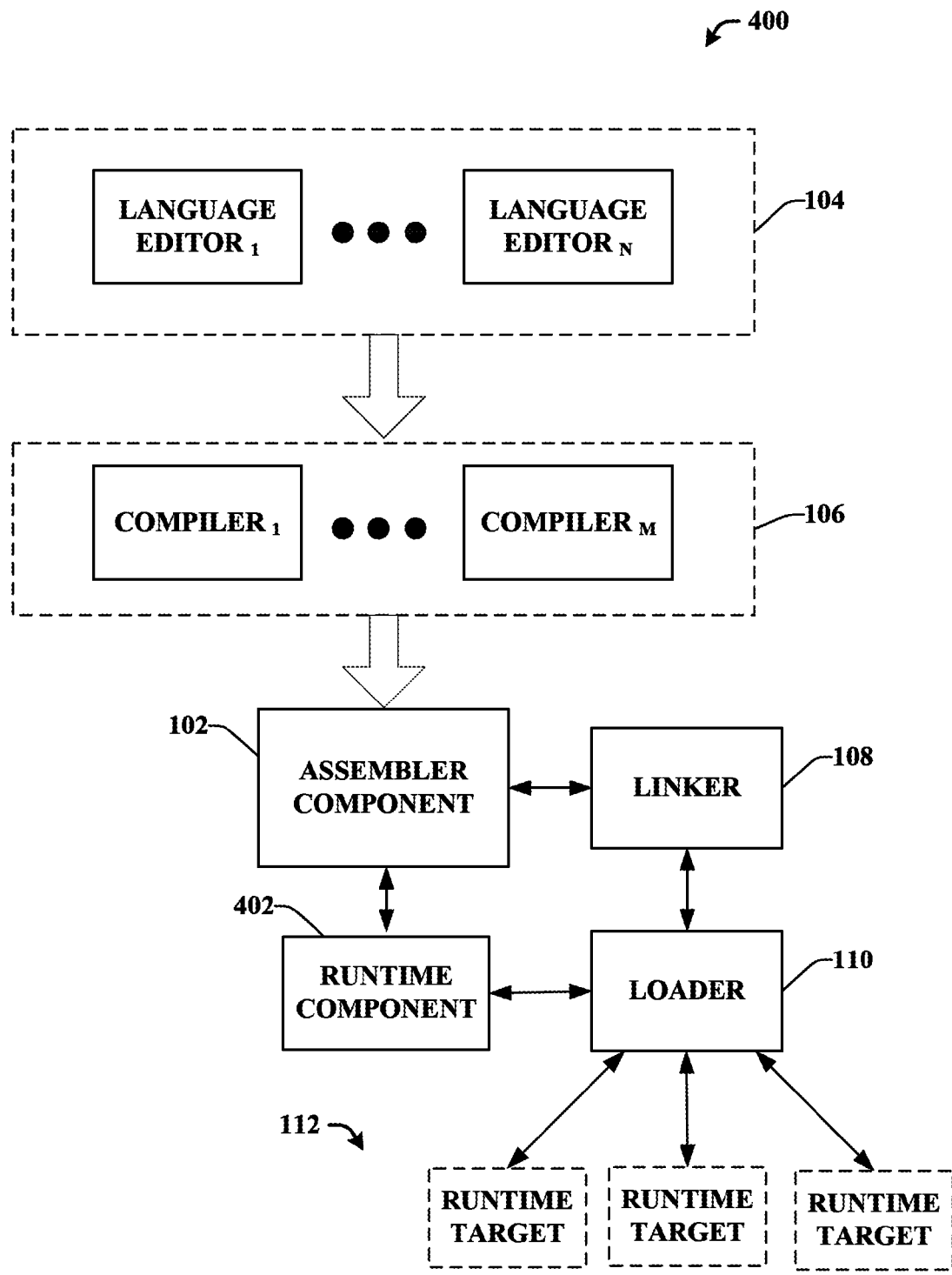
FIG. 4 illustrates a block diagram of an exemplary system that facilitates implementing TEC code format control application to a target during runtime.

FIG. 4 illustrates a system 400 that facilitates implementing TEC code format control application to a target during runtime. The system 400 can include the assembler component 102 that can assemble an intermediate language object (e.g., instruction list object) from a portion of data compiled by a specific language compiler 106, wherein the specific language compiler 106 can receive applications or code created from at least one language specific editor 104. The linker 108 can create an instruction list binary file from the instruction list object, in which the loader 110 can create a TEC program for employment on at least one runtime target 112 from the instruction list binary file.

The system 400 can further include a runtime component 402 that facilitates implementing a portion of a TEC program to at least one runtime target 112. The runtime component 402 can provide an execution model that enables a scan loop (e.g., a first program), an event (e.g., a second program), or an interrupt (e.g., a third program). The scan loop can be implemented by the runtime component 402 in which the runtime execution cycle executes according to the following: scan input devices; consume bound variables; execute TEC code; produce bound variables; update output devices; save retained values; and/or sleep until next cycle. The event can be implemented by the runtime component 402 in which the runtime engine can execute after receiving an event such as the following: wait for an event; scan input devices; consume bound variables; executed TEC code; produce bound variables; update output devices; and/or save retained variables. The interrupt can be handled by the runtime component 402 in which the runtime engine can execute the following when the interrupt occurs: wait for the interrupt; scan input devices; consume bound variables; execute TEC code; produce bound variables; update output devices; and/or save retained values.

The subject innovation can further provide at least one of online change, redundancy, binding, and/or command management. The online change can be provided as follows: 1) scan input devices, 2) consume bound variables, 3) execute TEC code, 4) produce bound variables, 5) update output device, 6) save retained values, 7) sleep until next cycle, and 8) if online change then go to second program else go to 1). Redundancy can be provided by the following: 1) wait active sync signal, 2) scan input devices, 3) consume bound variables, 4) execute TEC code, 5) if active healthy, go to 1), else set standby as active, 6) produce bound variables, 7) update output devices; 8) save retained values, and 9) sleep until next cycle. Binding can be provided by the following: 1) scan input devices, 2) consume bound variables, 3) execute TEC code, 4) produce bound variables, 5) update output devices, 6) save retained values, and 7) sleep until next cycle. The command management can be provided as follows: 1) download, 2) upload, 3) start/stop object, 4) read/write access variable, 5)

debug, 6) monitor, 7) store/save retained variable, 8) read log file/status, 9) configure parameters, and 10) online change.

Figure 5:
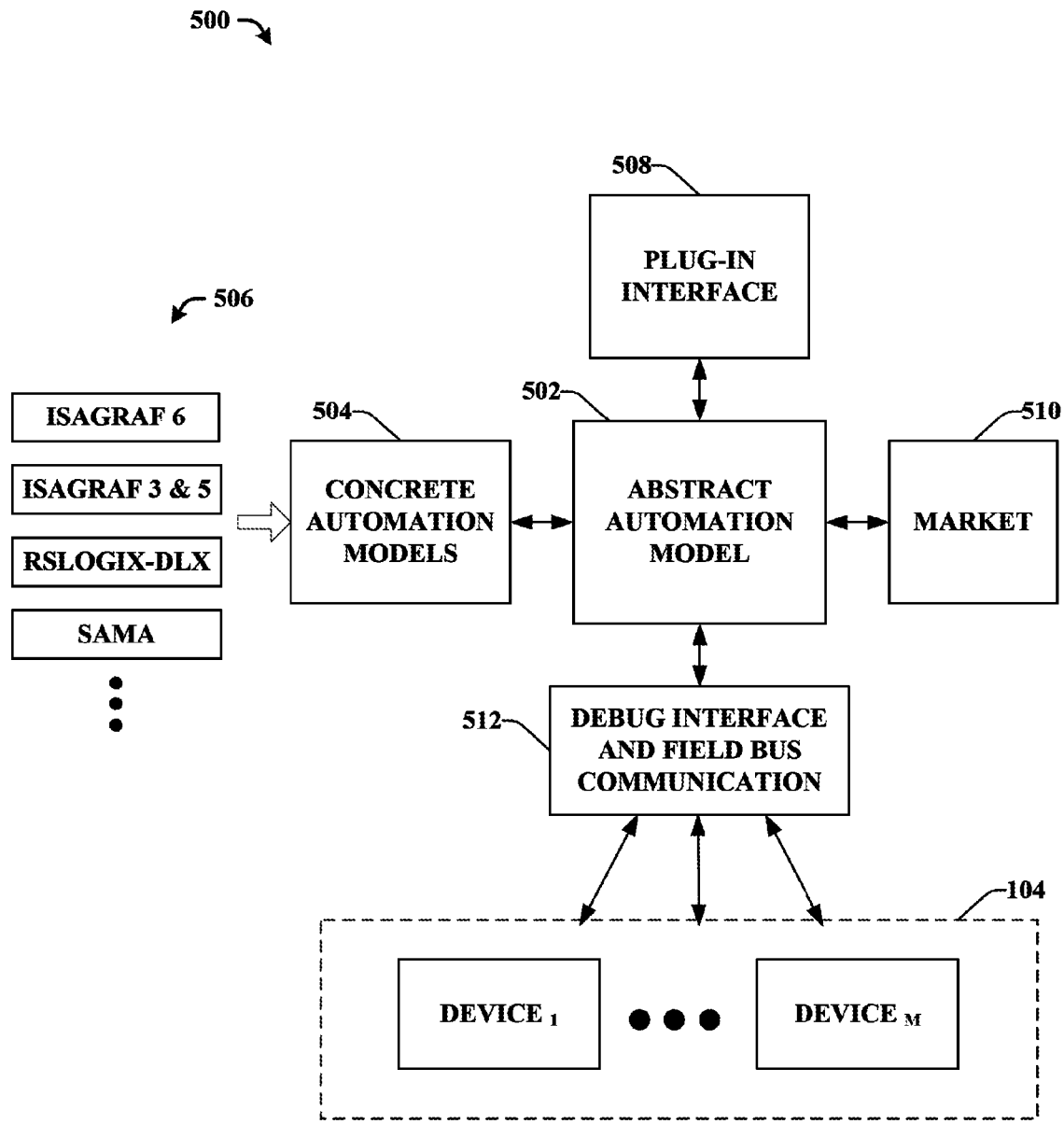
FIG. 5 illustrates a block diagram of an exemplary system that facilitates utilizing a universal model in accordance with the subject innovation.

FIG. 5 illustrates a system 500 that facilitates integrating utilizing a universal model in accordance with the subject innovation. The system 500 is a development platform that can employ generic programming models to enable developers to design control solutions in an abstract setting while facilitating code deployment and execution on substantially any type of end hardware platform. In one aspect, an Abstract Automation Model (AAM) 502 can be derived from common base model solutions or standards such as IEC 61131 and 61499, for example. Although any programming standard can be utilized for the underlying model, 61131 and 61499 support a majority of automation languages in the world today. The AAM 502 can define control structures that represent generic or abstract data objects having properties of a configuration, resource, program, and so forth. The AAM 502 can define integrity rules that ensure structural integrity such as a Tree structure (e.g., Parent to Child) or Project host configurations, which host resources, and so forth. The model also can define operations to update or query data. The AAM 502 can allow control software design to occur transparently and outside of the particular revision or type of development software that is utilized.

As part of a larger framework or development environment, a Concrete Automation Model (CAM) 504 can provide data interfaces associated with the generic data objects of the AAM 502 and according to a designated project format of differing development environments. For instance, various versions of a development program may have associated CAMs that link or map the respective versions to the underlying abstraction of the AAM 502. In another example, a particular hardware vendor may provide a CAM for a particular type of programming interface that is unique to the respective vendor. By providing the abstraction of the AAM 502 and mapping to any particular nuance of differing program environments via the CAM, developers can rapidly add new features according to the generic programming model provided by the AAM 502 yet efficiently support and convert to substantially any available development program. The AAM 502 can receive program commands from a plurality of programming versions 506 (e.g., ISaGRAF 1, 2, 3 . . . 6, RSLogix, etc.), where each version interfaces to the AAM 502 via an associated CAM 504. Plug-in development support can be provided by in-house or third-party developers by leveraging a plug-in interface 508 to increase the functionality of the AAM 502. Also, market applications (e.g., market 510) can also be supported in the AAM 502 that are designed or pre-packaged for known industrial solutions. When a control solution has been developed, the AAM can be compiled to run on substantially any control platform by leveraging a debug interface and field bus communication 512. The debug interface and field bus communication 512 can enable various devices 104 to seamless and universally interact with the AAM 502 regardless of the device type, make, model, location, etc. Moreover, it is to be appreciated that there can be any suitable number of devices from device$_1$ to device$_M$, where M is a positive integer.

In general, the subject innovation can allow any suitable compiled portion of data regardless of programming language to be generated into an intermediate language (e.g., instruction list) in which such intermediate language can be increase execution speed while being platform independent yet can be specifically configured for a particular resource, target, processor, and/or device. The assembler component 102, linker 108, and/or the loader 110 can further enable the universal interaction between such programming languages and/or compiled processes in connection with the platform depicted in FIG. 5.

Figure 6:
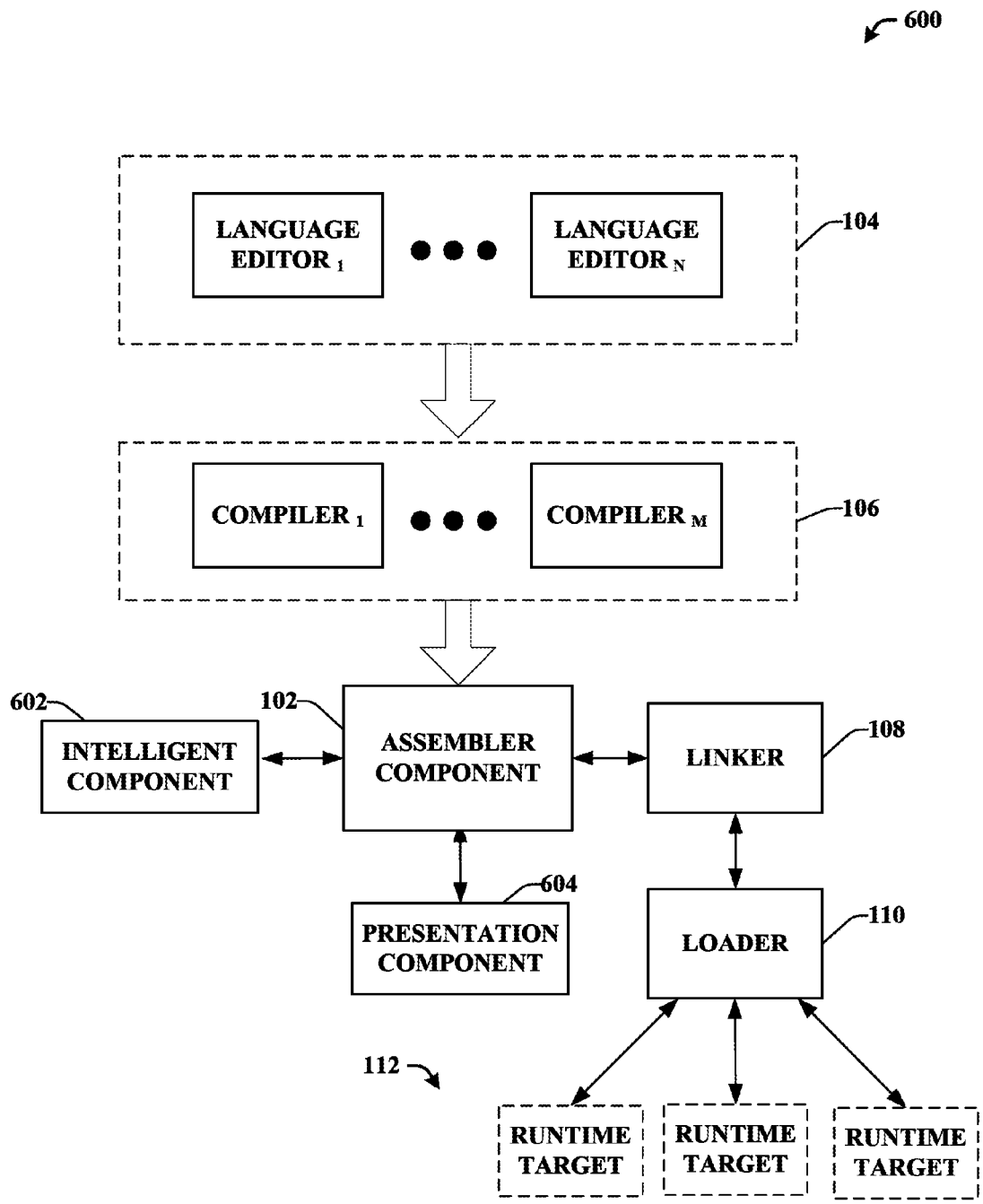
FIG. 6 illustrates a block diagram of an exemplary system that facilitates generating an intermediate language from a plurality of language specific compilers for universal programming of a resource.

FIG. 6 illustrates a system 600 that employs intelligence to facilitate generating an intermediate language from a plurality of language specific compilers for universal programming of a resource. The system 600 can include the assembler component 102, the linker 108, at least one language editor 104, at least one compiler 106, and the loader 110 that can all be substantially similar to respective components, linkers, editors, compilers and loaders described in previous figures. The system 600 further includes an intelligent component 602. The intelligent component 602 can be utilized by at least one of the assembler component 102, the linker 108, the loader 110, the language editor 104, and/or the compiler 106 to facilitate generating instruction list from a portion of compiled code or process, wherein the instruction list can be created into a target specific TEC program. For example, the intelligent component 606 can infer programming language, compiler information, intermediate language, instruction list program data, instruction list object data, instruction list binary file data, TEC program data, PLC definitions, object and/or binary file format, redundancy, binding, command management, online change, user settings, optimized configuration based on platform, optimized settings based on programming language, etc.

Moreover, the intelligent component 602 can facilitate utilizing a consumption of a material and the status of such material to an operator role and/or position. For example, the intelligent component 602 can infer the consumption of raw materials utilized in the production of a particular industrial automation process and/or system. Such inference can be based at least in part upon historic data related to the consumption of materials, status and/or supply of materials, etc. Moreover, such consumption and status of materials can be communicated to an operator and/or the role of an operator.

It is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

A presentation component 604 can provide various types of user interfaces to facilitate interaction between a user and any component coupled to the assembler component 102. As depicted, the presentation component 604 is a separate entity that can be utilized with the assembler component 102. However, it is to be appreciated that the presentation component 604 and/or similar view components can be incorporated into the assembler component 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to the assembler component 604.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
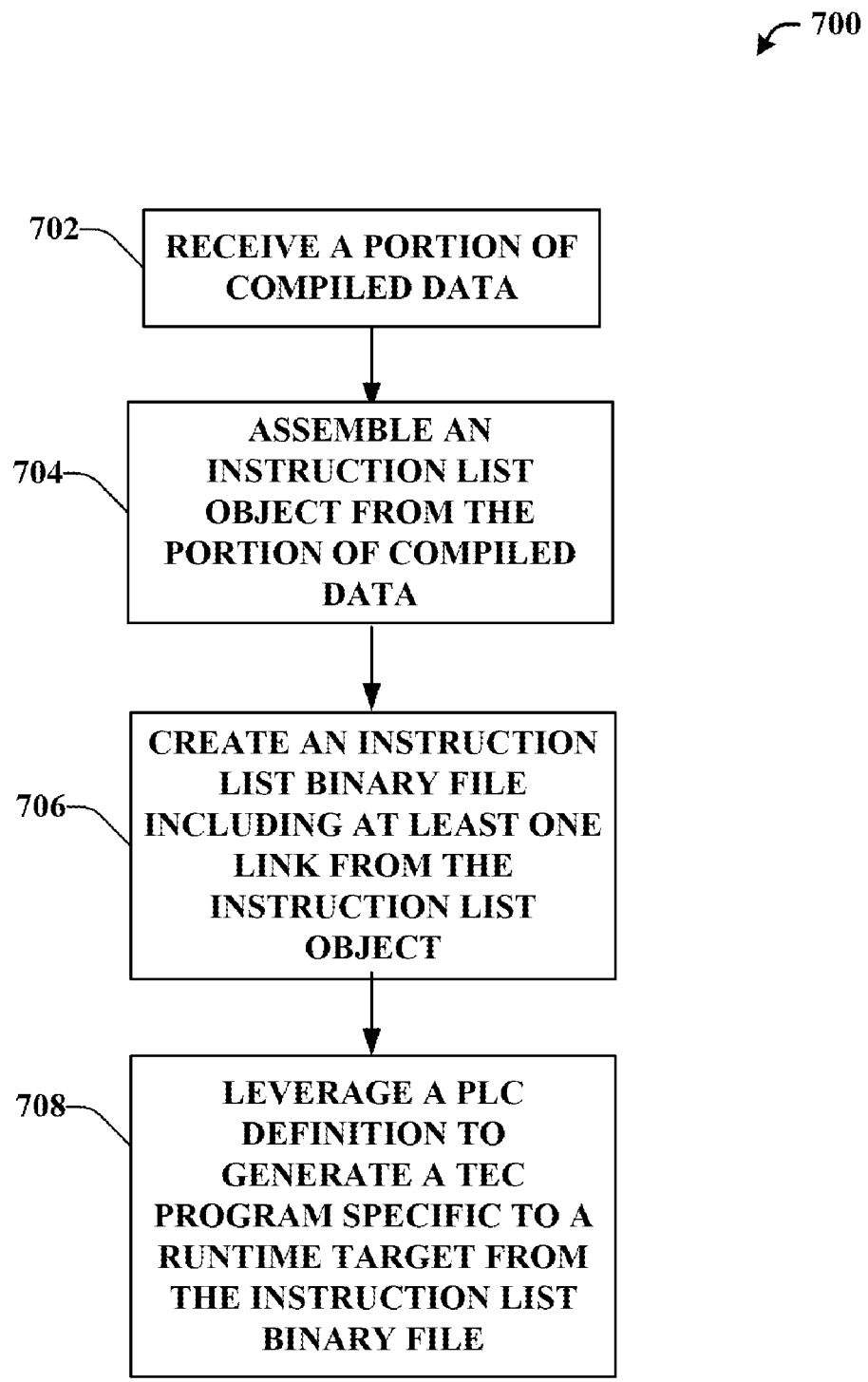
FIG. 7 illustrates an exemplary methodology for utilizing an intermediate language to enable universal programming for a plurality of devices within an industrial environment.
Figure 8:
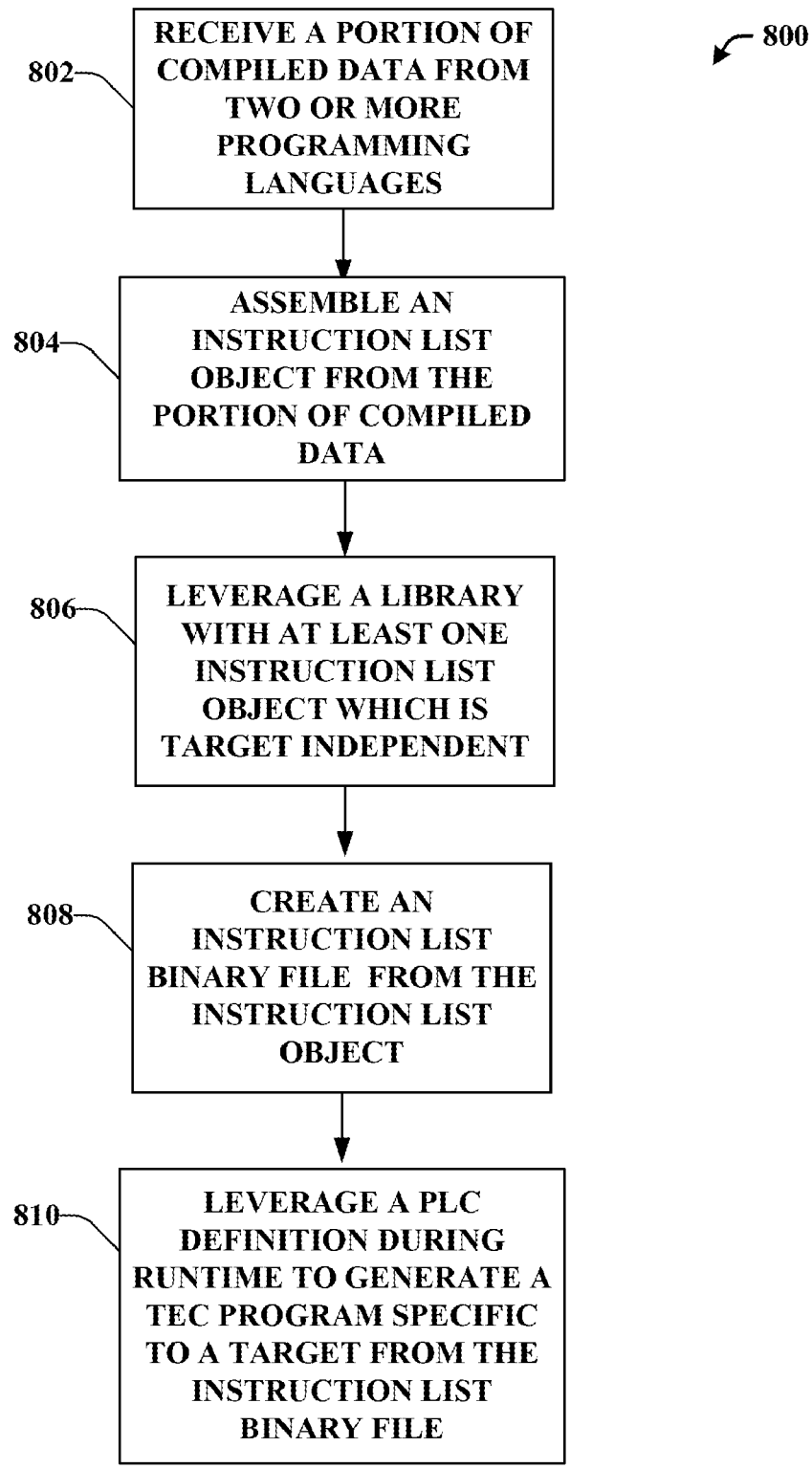
FIG. 8 illustrates an exemplary methodology that facilitates employing an intermediate language from various compilers to create a TEC code format control application.

Referring to FIGS. 7-8, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a methodology 700 for utilizing an intermediate language to enable universal programming for a plurality of devices within an industrial environment. At reference numeral 702, a portion of compiled data can be received. For example, a language editor can create a portion of a process or a portion of code and a respective language compiler can compile a portion of data. It is to be appreciated that any suitable programming language can be associated with at least one language editor and respective compiler. In other words, each programming language can include a corresponding compiler for such programming language. The programming language can be, but is not limited to, a ladder diagram, a function block diagram, a structured text, an instruction list, a sequential function chart, 61499, any suitable programming language associated with a standard, any suitable programming language associated with an industrial process, etc.

At reference numeral 704, an instruction list object can be assembled from the portion of compiled data. It is to be appreciated that the instruction list object can be target independent and intermediate language to which can be universally and seamlessly applied to various targets, devices, resources, processors, etc. regardless of the platform. At reference numeral 706, an instruction list binary file including at least one link can be created from the instruction list object. At reference numeral 708, a PLC definition can be leveraged to generate a Target Executable Code (TEC) program specific to a runtime target from the instruction list binary file.

FIG. 8 illustrates a methodology 800 that facilitates employing an intermediate language from various compilers to create a TEC code format control application. At reference numeral 802, a portion of compiled data from two or more programming languages can be received. The portions of data can be a first portion of code compiled in a first language and a second portion of code compiled in a second language. At reference numeral 804, an instruction list object can be assembled from the portion of compiled data.

At reference numeral 806, a library with at least one instruction list object which is target independent can be leveraged. In other words, instruction list objects can be generated and stored in a library to enable access to a plurality of instruction list objects from various compiled portions of data. At reference numeral 808, an instruction list binary file can be created from the instruction list object. At reference numeral 810, a PLC definition can be leveraged during runtime to generate a TEC program specific to a target from the instruction list binary file.

Figure 9:
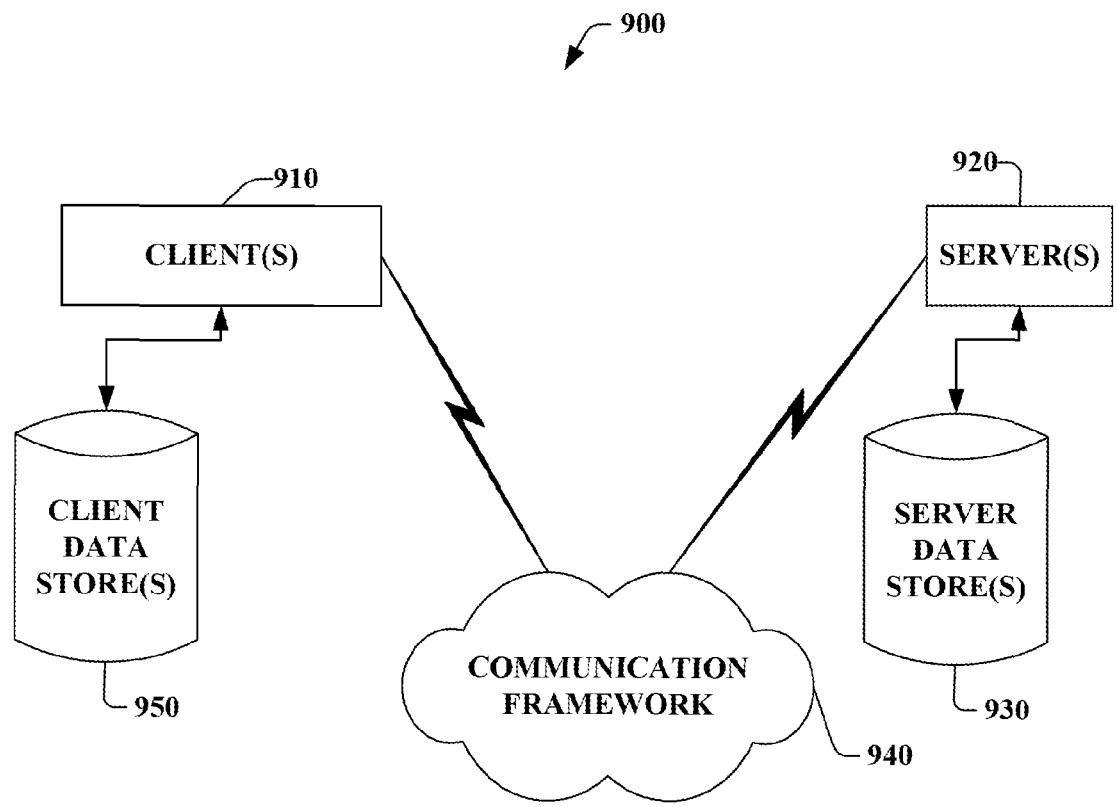
FIG. 9 illustrates an exemplary networking environment, wherein the novel aspects of the claimed subject matter can be employed.
Figure 10:
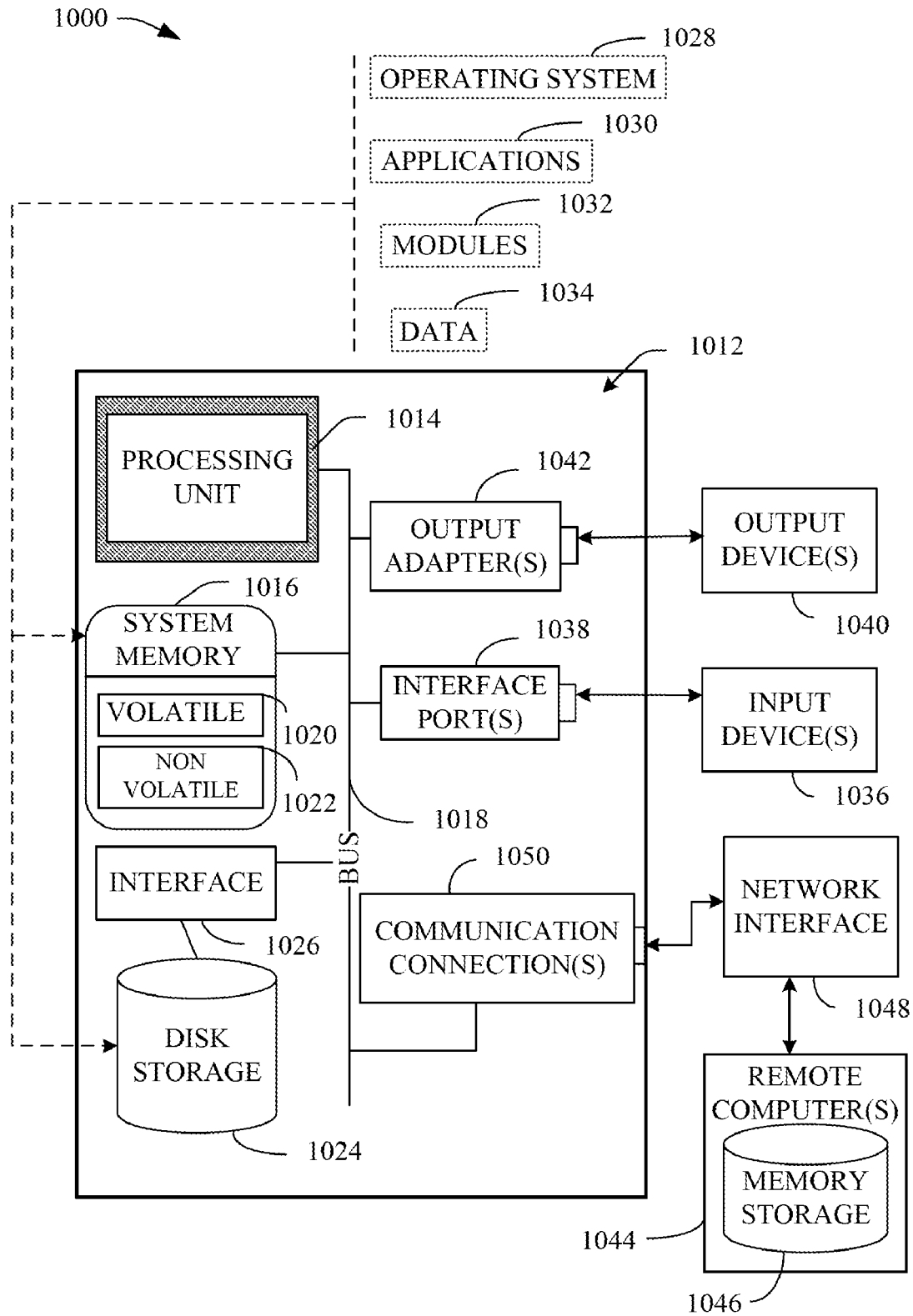
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates creating executable code for an industrial environment, comprising:

a processor;

a memory communicatively coupled to processor, the memory having stored therein computer-executable instructions, comprising:

a compiler configured to receive a portion of data programmed in a programming language and to compile the portion of data into compiled code;

an assembler component configured to assemble the compiled code into an assembly object code in an intermediate language that is hardware processor independent;

a linker configured to generate an intermediate language binary file from assembly object code, wherein the intermediate language binary file is hardware processor independent; and a loader configured to create a first target executable code program from the intermediate language binary file based on a first programmable logic controller definition for a first hardware processor and to create a second target executable code program from the intermediate language binary file based on a second programmable logic controller definition for a second hardware processor, wherein the first hardware processor is distinct from the second hardware processor, the first target executable code program is native assembler code executable by the first hardware processor but not by the second hardware processor, and the second target executable code program is native assembler code executable by the second hardware processor but not by the first hardware processor.

2. The system of claim 1, the intermediate language is instruction list.

3. The system of claim 1, the assembly object code is an instruction list object.

4. The system of claim 1, the intermediate language binary file is an instruction list binary file.

5. The system of claim 1, further comprising two or more language editors, each language editor is specific to a respective programming language.

6. The system of claim 5, further comprising two or more compilers, each compiler is specific to a respective language editor.

7. The system of claim 1, the programming language is at least one of a ladder diagram, a function block diagram, a structured text, an instruction list, a sequential function chart (SFC), a programming language associated with a standard, or a programming language associated with an industrial process.

8. The system of claim 1, wherein the portion of data is an industrial control application.

9. The system of claim 1, further comprising a data store that stores at least one of the compiled code, the portion of data, the assembly object code, the intermediate language binary file, the first target executable code program, the second target executable code program, the first programmable logic controller definition, or the second programmable logic controller definition.

10. The system of claim 1, further comprising a library that includes two or more assembly object code employed by the linker to create the intermediate language binary file.

11. A method to generate control system executable code, comprising:
    employing a processor executing computer executable instructions embodied on at least one non-transitory computer readable medium to perform operations comprising:
        receiving compiled code in a programming language;
        assembling the compiled code into an assembly code object in an intermediate language that is hardware processor independent;
        creating an intermediate language binary file from the assembly object code, wherein the intermediate language binary file is hardware processor independent; and
        creating a first target executable code program from the intermediate language binary file based on a first programmable logic controller definition for a first hardware processor and creating a second target executable code program from the intermediate language binary file based on a second programmable logic controller definition for a second hardware processor, wherein the first hardware processor is distinct from the second hardware processor, the first target executable code program is native assembler code executable by the first hardware processor but not by the second hardware processor, and the second target executable code program is native assembler code executable by the second hardware processor but not by the first hardware processor.

12. The method of claim 11, the intermediate language is instruction list.

13. The method of claim 11, the compiled code is an industrial control application.

14. The method of claim 11, the programming language is at least one of a ladder diagram, a function block diagram, a structured text, an instruction list, a sequential function chart, a programming language associated with a standard, or a programming language associated with an industrial process.

15. A non-transitory computer-readable medium having instructions stored thereon that, in response to execution, cause at least one device to perform operations to facilitate creating executable code for an industrial environment, the operations comprising:
    receiving compiled code in a programming language;
    assembling the compiled code into an assembly code object in an intermediate language that is hardware processor independent;
    creating an intermediate language binary file from the assembly object code, wherein the intermediate language binary file is hardware processor independent; and
    creating a first target executable code program from the intermediate language binary file based on a first programmable logic controller definition for a first hardware processor and creating a second target executable code program from the intermediate language binary file based on a second programmable logic controller definition for a second hardware processor, wherein the first hardware processor is distinct from the second hardware processor, the first target executable code program is native assembler code executable by the first hardware processor but not by the second hardware processor, and the second target executable code program is native assembler code executable by the second hardware processor but not by the first hardware processor.

16. The non-transitory computer-readable of claim 15, the programming language is at least one of a ladder diagram, a function block diagram, a structured text, an instruction list, a sequential function chart, a programming language associated with a standard, or a programming language associated with an industrial process.

* * * * *